US008770636B2

United States Patent
Shimotsu (10) Patent No.: US 8,770,636 B2
(45) Date of Patent: Jul. 8, 2014

(54) BUMPER

(71) Applicant: Asteer Co., Ltd., Soja (JP)

(72) Inventor: Koji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 14/011,485

(22) Filed: Aug. 27, 2013

(65) Prior Publication Data

US 2014/0062105 A1    Mar. 6, 2014

(30) Foreign Application Priority Data

Aug. 28, 2012   (JP) .................. 2012-187928

(51) Int. Cl.
*B60R 19/03* (2006.01)
(52) U.S. Cl.
USPC .......................... 293/102; 293/133; 293/154
(58) Field of Classification Search
USPC ............. 296/187.09; 293/102, 120, 121, 133, 293/154
See application file for complete search history.

(56) References Cited

U.S. PATENT DOCUMENTS

| 6,361,092 | B1 | 3/2002 | Eagle et al. | |
| 7,678,208 | B2 * | 3/2010 | Bodin | 293/133 |
| 8,136,871 | B2 * | 3/2012 | Yoshida et al. | 296/205 |
| 2008/0054656 | A1 | 3/2008 | Guiles et al. | |
| 2009/0045638 | A1 * | 2/2009 | Handing et al. | 293/155 |
| 2009/0242086 | A1 * | 10/2009 | Thomas et al. | 148/654 |
| 2010/0194125 | A1 * | 8/2010 | Wibbeke et al. | 293/120 |
| 2012/0025545 | A1 * | 2/2012 | Haneda et al. | 293/102 |
| 2013/0113224 | A1 * | 5/2013 | Tsuchida et al. | 293/102 |

FOREIGN PATENT DOCUMENTS

JP        2010179832 A   *   8/2010

OTHER PUBLICATIONS

Machine Translation of JP-2010179832-A printed from the JPO website, Dec. 8, 2013.*

* cited by examiner

*Primary Examiner* — Jason S Morrow
(74) *Attorney, Agent, or Firm* — DLA Piper LLP (US)

(57) ABSTRACT

Providing a bumper absorbing large amount of impact energy with respect to both a light collision and a heavy collision, and preventing the reinforcement beam from bending and protruding backward at a portion where an obstacle collides and from displacing backward in this protruding state. Provided is a bumper for vehicles including a reinforcement beam made of metal and a pair of support members having a hollow cross section, protruding from a vehicle frame, and supporting the reinforcement beam therebetween. A quenched region is provide over a portion including a middle of the reinforcement beam. Unquenched portions are provided on the pair of connecting portions or a pair of adjacent portions inside the pair of connecting portions.

4 Claims, 8 Drawing Sheets

BUMPER

BACKGROUND OF THE INVENTION

1. Field of the Invention

The present invention relates to a bumper for vehicles including a reinforcement beam made of metal and a pair of support members having a hollow cross section. The pair of support members protrudes from a vehicle frame and supports the reinforcement beam therebetween.

2. Description of the Related Art

A bumper is, for example, provided at a front end of a vehicle. The bumper absorbs an impact energy when the vehicle collides with an object. A bumper configured by a reinforcement beam which is totally quenched and a pair of supporting members supporting the reinforcement beam therebetween is proposed. This kind of bumpers absorbs the impact energy by plastically deforming or crashing the reinforcement beam or the pair of supporting members. Since a force-stroke curve and a total impact energy absorption amount change in accordance with how the reinforcement beam deforms or crashes, a structure and configuration of the reinforcement beam are researched as in U.S. Pat. No. 6,361,092 B1 and US 2008/0054656 A1. The force-stroke curve shows a relationship between a displaced amount (a retracting amount) of the reinforcement beam and a load required to cause the reinforcement beam to displace at the displaced amount. The impact energy absorption amount is calculated by following equation. Impact energy=load×displaced amount.

U.S. Pat. No. 6,361,092 B1 discloses frame rails 12 and a bumper beam 7 supported between the frame rails. Cutouts 44, 48, 52 are provided between a front end and a rear end of the bumper beam. According to claim 1, webs are formed between cutouts, and the cutouts cause the rail to plastically deform in a first section connected with the frame rail in the front end of the bumper beam. It is assumed that the bumper beam is made of metal.

US 2008/0054656 A1 discloses a bumper system including a roll-formed tubular beam 21 with bracket mounts 22. The bracket mount 22 are welded to a rear surface of the roll-formed tubular beam 21. The tubular beam is formed from ultra-high-strength steel of at least 80 ksi tensile strength. The beam includes a center section, corner-forming end sections, and mounting sections intervening the center section and the end sections. At least one portion of one of the center section, the end sections, and the mounting sections is annealed to have reduced tensile strength lower than 80 ksi. According to the description in paragraph 0015, by annealing a rear wall portion of a cross section at the mounts 22 and not annealing a front wall portion, the beam is able to better maintain a shape of its front surface while reducing transmission of peaks in an impact energy to a vehicle frame.

Safety standards are established as for a collision between a bumper and an object. According to one of the safety standards, the collision is classed as a light collision often observed at a low speed and a heavy collision often observed at a high speed. The bumper is expected to absorb as large energy as it can with respect to both the light collision and the heavy collision; expected not to bend and protrude backward at a portion where an obstacle collides; and expected not to displace backward in this protruding state so much in order to prevent the bumper from damaging members configuring vehicles such as a radiator. In order to achieve this, with respect to the light collision, it is desired that a reinforcement beam do not displace backward, the reinforcement beam only deform and this deformation do not affect a pair of support members supporting the reinforcement beam therebetween. With respect to the heavy collision, it is desired that both of the reinforcement beam and the pair of support members plastically deform or crash and an impact energy do not affect a frame of a vehicle.

In the bumper of U.S. Pat. No. 6,361,092 B1, the cutouts are formed on a plane called a first surface between the front end of the bumper and the rear end of the bumper to reduce a strength of the first section connected with the frame rail and facilitate it to plastically deform. The cutouts on the first surface cause an the first surface to crack from its inner edge by an impact, or prevent the bumper from smoothly plastically deforming or crashing due to a lack of a mechanical continuity on the first surface. This results in reducing the gross energy adsorption amount and failing to prevent the reinforcement beam from displacing backward.

In the bumper of US 2008/0054656 A1, the rear wall portion of a cross section at the mounts is integrally annealed with other portions. The plastic deformation or clash cannot be precisely controlled with annealing. It is unclear that enough gross energy adsorption amount is obtained and that the reinforcement beam is successfully prevented from displacing backward. Since the heated rear wall portion is needed to be slowly chilled in annealing, a productivity of the bumper of US 2008/0054656 A1 is rather low, whereas vehicle members are expected to be manufactured in large volume.

To sum up, the bumpers disclosed in U.S. Pat. No. 6,361,092 B1 and US 2008/0054656 A1 have problems in that the gross energy adsorption amount is reduced, and in that displacement of the reinforcement beam to the backward is not well prevented. Further, US 2008/0054656 A1 has a problem in the productivity. In view of these problems, the present invention provides a bumper which is not problematic in productivity. Further, the present invention provides a bumper in which support members are not affected by a plastic deformation or crash of a reinforcement beam while undergoing the light collision; a large gross energy adsorption amount is obtained by plastically deforming or crashing both of the reinforcement beam and the supporting members while undergoing the heavy collision; and the reinforcement beam is successfully prevented from displacing backward.

SUMMARY OF THE INVENTION

Present invention is a bumper for vehicles including a reinforcement beam made of metal and a pair of support members having a hollow cross section. The pair of support members supports the reinforcement beam therebetween. The reinforcement beam is provided with a pair of connecting portions to which the pair of support members is connected. The reinforcement beam includes a quenched region and unquenched portions. A mechanical strength of the unquenched portions is weaker than the mechanical strength of the pair of support members and the quenched region. The unquenched portions are provided on the pair of connecting portions or a pair of adjacent portions inside the pair of connecting portions.

The reinforcement beam is made of metal, preferably made of a metal plate or metal plates. A strength of whole of the reinforcement beam is enhanced by quenching whole of the reinforcement beam except for unquenched portions. The pair of supporting members may be either a separate members protruding from the vehicle frame or integral members protruding from the vehicle frame as one member. Material of the pair of supporting members is not limited to metals and may be ceramics or plastics as long as the pair of supporting members plastically deforms or crashes to absorb the impact energy. "Connecting portion" means a portion divided by boundaries of a width of the supporting member. "Adjacent portion inside the connecting portion" means an inside portion adjacent to the connecting portion excluding the center region of the reinforcement beam. The unquenched portions may be provided over both of the connecting portion and the adjacent portion inside the connecting portion.

The unquenched portions are provided on the pair of connecting portions or a pair of adjacent portions inside the pair of connecting portions. The mechanical strength of the unquenched portions is smaller than the mechanical strength of the pair of support members and the quenched region. The unquenched portions more easily plastically deform than the quenched region while undergoing the light collision. This prevents the connecting portions from being pulled by a plastic deformation or crash of portions other than the connecting portions, and prevents supporting member from crashing or inclining.

The unquenched portions may be provided over portions of high mechanical strength. For example, in case the reinforcement beam has a hollow cross section having corners, the unquenched portions are provided over at least one corner of the cross section cut across the pair of connecting portions or the pair of adjacent portions inside the pair of connecting portions. The unquenched portions are preferably provided along longitudinal direction of the reinforcement beam to include the corner of the cross section. Because a plane between the corners is easy to be plastically deformed or crashed, if the unquenched portions are provided over the corners sandwiching the plane, the pair of connecting portions or the pair of adjacent portions inside the pair of connecting portions easily plastically deform or crash. The hollow cross section having corners may be, for example, a rectangular cross section, a hat shaped cross section having flanges, and others. The rectangular cross section may have an inside wall (inside walls) within the rectangular cross section. For example, the inside wall (inside walls) connecting a front wall and rear wall of the bumper is exemplified.

In the present invention, the unquenched portions are formed by preventing temperature of targeted portions from rising or by chilling the targeted portions when conducting quenching treatment. The quenching treatment does not include a gradual chilling treatment lasting for long time, which is necessary for an annealing treatment, after heating. Since the bumper of present invention is readily manufactured by forming the unquenched portions when conducting quenching treatment on the reinforcement beam, the productivity of the bumper of present invention is not impaired.

According to the present invention, the connecting portions of the reinforcement beam or the pair of adjacent portions inside the pair of connecting portions is more easily plastically deform than the quenched region. This prevents the connecting portions from being pulled by a plastic deformation or crash of portions other than the connecting portions and prevents supporting member from bending or inclining. Because the bend or inclination of the supporting member is a cause of reducing the gross energy adsorption amount, the energy adsorption amount is enlarged according to the present invention. The bumper reinforcement beam is prevented from protruding backward and displacing backward in this protruding state.

According to the present invention, whole of the reinforcement beam and the connecting portions plastically deform or crash differently in the case of the light collision. While undergoing the heavy collision, both of the reinforcement beam and the supporting member plastically deform or crash. The vehicle frame is not influenced by the light collision due to the plastic deformation or crash of the reinforcement beam. With respect to the heavy collision, both of the reinforcement beam and the supporting member to plastically deform or crash to secure gross energy adsorption amount. Also, with respect to the heavy collision, the reinforcement member is prevented from protruding backward and displacing backward in this protruding state. Productivity of the bumper of present invention is excellent.

DETAILED DESCRIPTION OF THE PREFERRED EMBODIMENTS

Preferred embodiment to carry out the present invention is hereinafter explained with reference to Figs. One example of the present invention is illustrated in FIGS. 1 to 5. Bumper 1 of the present example includes; a reinforcement beam 11 made of a steel plate which is totally quenched except for unquenched portions 119; and a pair of support members 12, 12 made of steel plate and protruding from a vehicle frame, which is not illustrated in Figs. The bumper 1 of the present example is connected to the vehicle frame via a pair of connecting flanges 122, 122 provided at back end of the pair of support members 12, 12.

The reinforcement beam 11 includes a front face 111, an upper face 112 continuing from an upper end of the front face 111, a lower face 114 continuing from a lower end of the front face 111, an upper flange 113 continuing from a back end of the upper face 112 and a lower flange 115 continuing from a back end of the lower face 114. The upper face 112, the upper face 112, the lower face 114, the upper flange 113 and the lower flange 115 are folded to shape a hat shape cross section. The reinforcement is made of a steel plate and has a hollow cross section having corners. The back face of the reinforcement beam is not closed except for right and left ends of the reinforcement beam. The reinforcement beam 11 absorbs an impact energy generated by colliding an obstacle at a load F by plastically totally deforming thereof. The impact energy is calculated by the following equation. Impact energy=load× displacing amount of the middle portion where the obstacle strikes of the front face 111.

The reinforcement beam 11 has a bending shape whose middle portion in longitudinal direction protruding forward, which is namely an arch shape. The reinforcement beam 11 is provided with a pair of connecting portions 116, 116 at back end. The pair of connecting portion 116, 116 has a flat face continuing from the upper flange 113 and the lower flange 114 of both ends of the reinforcement beam 11. The pair of support member 12, 12 is provided with a connecting flange 121 having a flat face which is rectangular in front view. The connecting flange 121 of the pair of support member 12, 12 corresponds to the pair of connecting portion 116, 116, and is connected to thereto.

The reinforcement beam 11 of the present example is totally quenched except for unquenched portions 119. The reinforcement beam 11 is a hat shaped cross section. The unquenched portions 119 are provided over edges 117, 117 between the front face 111, the upper face 112 and the lower face 114 and over edges 118, 118 between the upper flange 113, the lower flange 114, the upper face 112 and the lower face 114. In the present example in FIG. 1, four unquenched portions 119 are provided per each support member 12. In other words, four unquenched portions 199 are provided over four corners of the hat shaped hollow cross section cut across each connecting portion or each adjacent portion inside the pair of connecting portions. The unquenched portions are not formed on a middle portion of the reinforcement beam 11. Shape of the unquenched portions is not limited as long as the unquenched portions are able to prevent the edges from excessibly enhancing a mechanical strength. For example, the shape of the unquenched portions may be a liner, a curved line, or zig-zag line.

The unquenched portions are formed by, for example, preventing temperature from rising at unquenched portions 119 provided over the edges 117, 118. Temperature rising is prevented, for example, by pressing a chilling block thereon while heating the reinforcement beam 11 so that the unquenched portions 119 keep below than a transformation start temperature (AC3) and whole of the reinforcement beam except for the unquenched portions 119 is heated beyond a transformation complete temperature (AC 1). The unquenched portion 119 may be formed by suspending hating heating the reinforcement beam 11, and then pressing the chilling block with respect to the unquenched portions 119 over the edges 117, 118 to prevent temperature from rising, and finally resuming heating so that the unquenched portions 119 keep below than a transformation start temperature (AC3) and whole of the reinforcement beam except for the unquenched portions 119 heats beyond a transformation complete temperature (AC 1).

The pair of support members 12 of the present example is made of a steel plate to be the hollow cross section having corners, and is provided with the connecting flange 121 at the front end and the connecting flange 122 at the back end. The connecting flange 121 at the front end is connected to one of the pair of connecting portions 116, 116 of the reinforcement beam 11. The connecting flange 122 at the back end is connected to the vehicle frame, which is not illustrated in Figs. The pair of support members 12 absorbs the impact energy generated by colliding an obstacle 2 at a load F by a plastic deformation compressing whole of the support member 12 in backward direction.

The pair of support members 12 is not quenched for enhancing its mechanical strength so that it can absorb the impact energy by the plastic deformation compressing the pair of support members 12 in the backward direction. The mechanical strength of the unquenched portions 119 is made smaller than the quenched region by totally quenching the reinforcement beam 11 except for the unquenched portions 119. The mechanical strength of the unquenched portions 119 is made smaller than the support member 12 by, for example, enlarging a thickness of the plate structuring the support member 12.

While undergoing the light collision, the reinforcement beam 1 collided with the obstacle 2 crashes to slightly displace backward. The arch shaped reinforcement beam become approximately flat in FIG. 4. Because the mechanical strength of the unquenched portions 119 is smaller than the middle portion of the reinforcement beam 11, the arch shaped reinforcement beam plastically deforms at unquenched potions 119 to be approximately flat as illustrated with broken lines and solid lines in FIG. 4. This deformation of the reinforcement beam 11 prevents the pair of supporting member 12, 12 from bending or inclining. The impact energy of the light collision is absorbed by plastic deformation of the reinforcement beam 11, which is a slight displacement to the backward and the plastic deformation at the unquenched portions 119. On the other hand, while undergoing the heavy collision, the arch shaped reinforcement beam 11 crashes to the backward direction and the pair of support members 12, 12 crushes to backward direction to displace the reinforcement beam 11 and absorb the impact energy. Still, the reinforcement beam 11 does not protrude backward.

Figure 6:
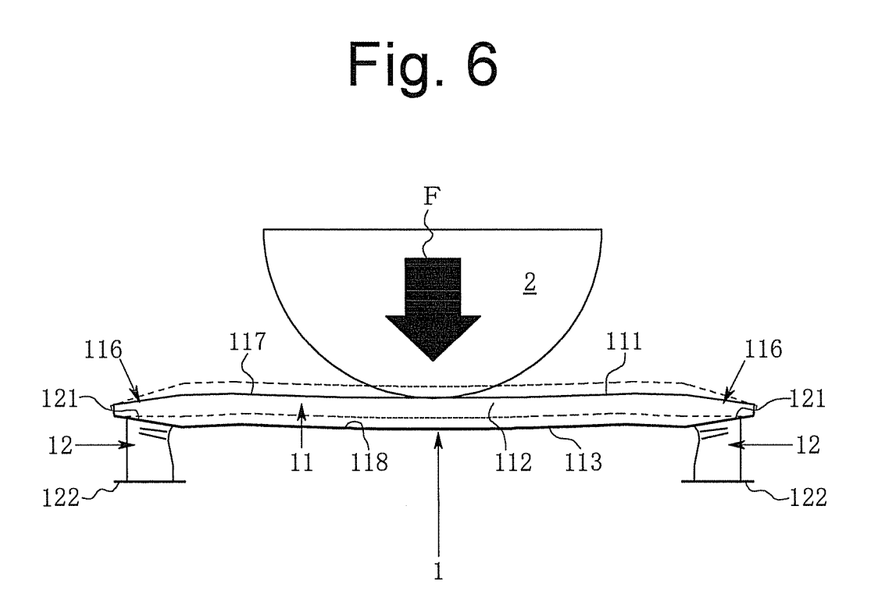
FIG. 6 is a plain view of the bumper according to a first comparative example, the bumper is undergoing the light collision, whole of a reinforcement beam is quenched in the first comparative example.
Figure 7:
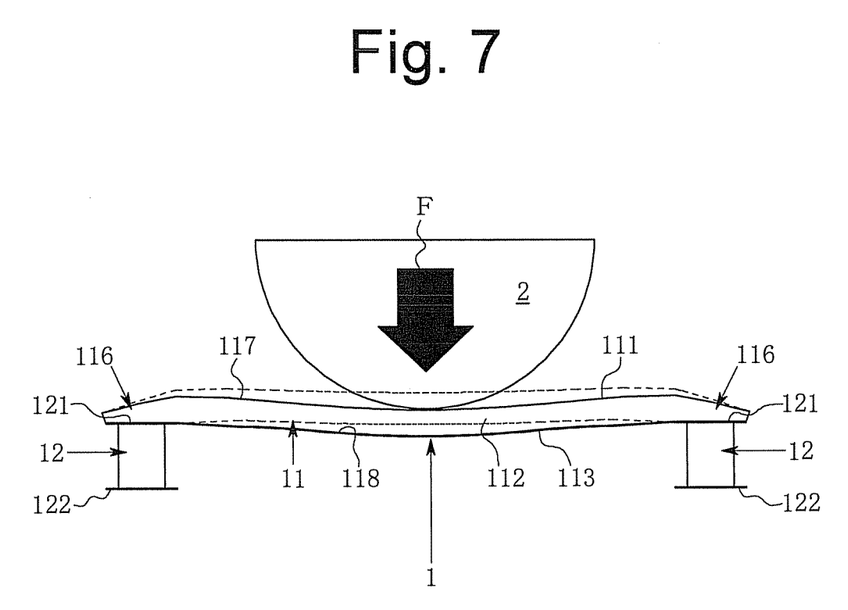
FIG. 7 is plain view of the bumper according to a second comparative example, the bumper is undergoing the light collision, a reinforcement beam is not quenched at all in the second comparative example.

Deformation of bumpers other than the present invention applying the load F is illustrated in FIGS. 6 and 7 for comparison. For a convenience of explanation, a bumper to be compared illustrated in FIG. 6 is referred to as first comparative example, and a bumper to be compared illustrated in FIG. 7 is referred to as second comparative example. Whole of a reinforcement beam 11 is quenched and any unquenched portions are provided in the bumper of the first comparative example. On the other hand, whole a reinforcement beam 11 is not quenched at all in the bumper of the second comparative example. The bumpers of the first comparative example and the second comparative example have an arch shaped reinforcement member as in the present example before colliding the obstacle 2. A pair of support members 12, 12 of the first comparative example crashes and inclines inside while undergoing the light collision as illustrated in FIG. 6 in case the obstacle 2 collides with the bumper 1. This is because that a reinforcement beam 11 collided with an obstacle 2 pulls a pair of connecting flanges 121, 121 of the pair of supporting members 12, 12 toward the middle portion where a force F is applied and displaces to the backward.

Figure 8:
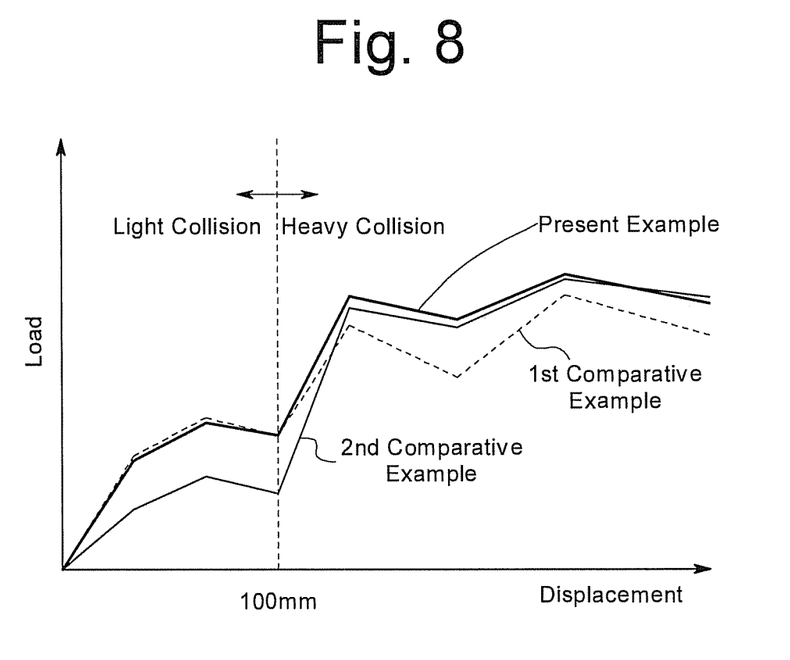
FIG. 8 is a graph showing a force stroke curves of the present example, the first comparative example, and the second comparative example.

In case the pair of support members 12, 12 crashes and inclines, a displacing amount of the reinforcement beam 11 becomes large. The reinforcement beam 11 of the present example of FIG. 4 collided with the obstacle 2 is illustrated with broken lines in FIG. 6 for reference. Further, in case the pair of support members 12, 12 crashes and inclines, the energy adsorption amount at the heavy collision reduces though the energy adsorption amount at the light collision increases as shown in FIG. 8. Also, if the pair of support members 12, 12 inclines, the pair of support members 12, 12 does not properly crash in the backward direction, which is often demanded by car manufacturers as specifications to attain.

A pair of support members 12, 12 does not crash and incline towards the middle portion in a bumper of the second comparative example as illustrated in FIG. 7. This is because that a reinforcement beam 11 bends backward at the middle portion where an obstacle 2 collides. The bumper 1 of the second comparative example absorbs impact energy by plastically deforming the reinforcement beam 11 while undergoing the light collision, and absorbs the impact energy by crashing the pair of support members 12, 12 in the backward direction while undergoing the heavy collision. The reinforcement beam 11 displaces backward with its middle portion protruding backward at the middle portion where the obstacle 2 collides while undergoing heavy collision. The reinforcement beam 11 of the present example of FIG. 4 collided with the obstacle 2 is illustrated with broken lines in FIG. 7 for reference.

Figure 1:
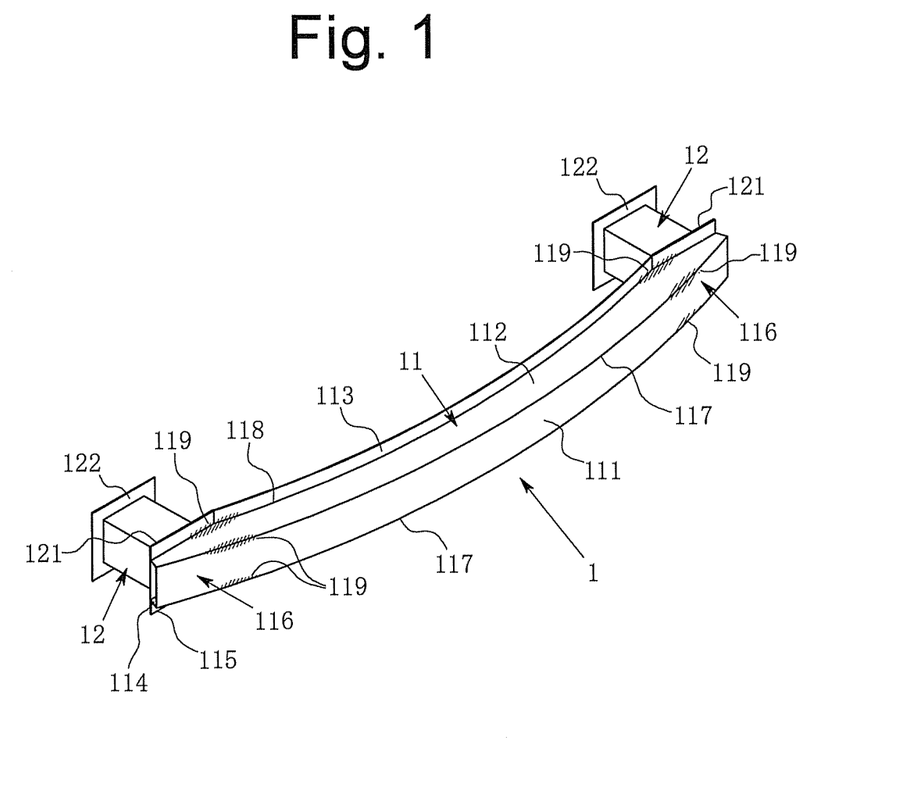
FIG. 1 is a perspective view of an example of the bumper of the present invention (hereinafter referred to as present example). Forward of the bumper corresponds to the lower right direction of Figure.
Figure 2:
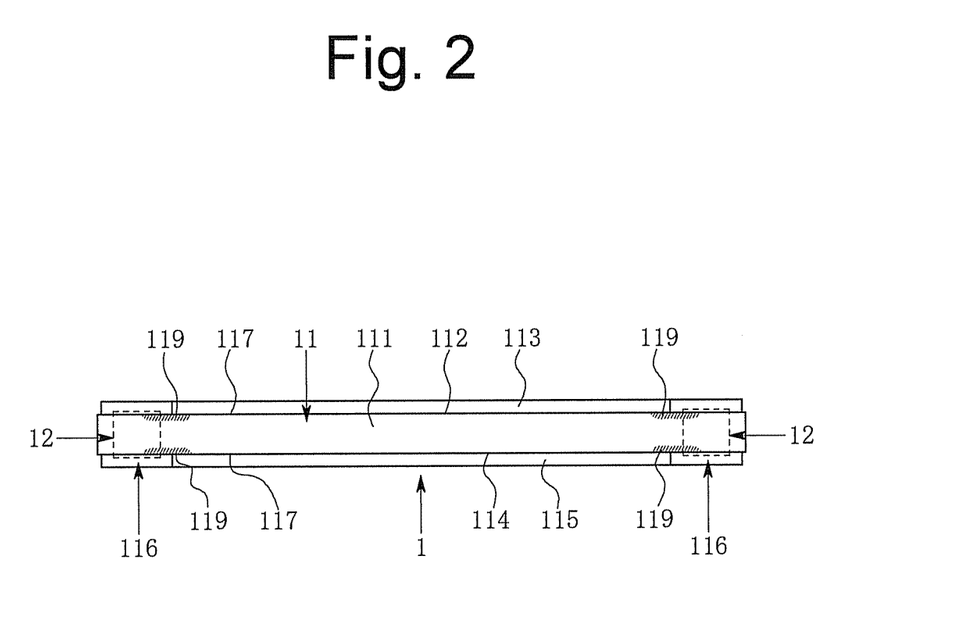
FIG. 2 is a front view of the bumper illustrated in FIG. 1.
Figure 3:
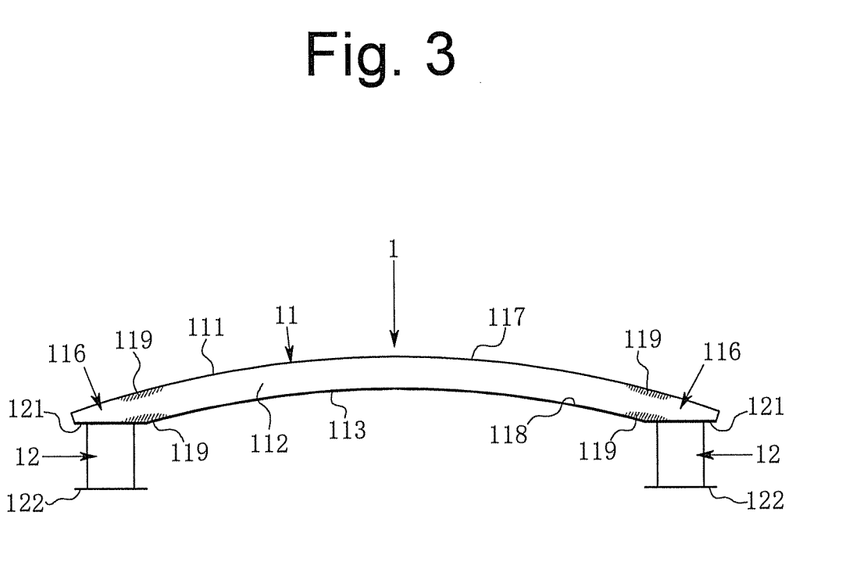
FIG. 3 is a plain view of the bumper illustrated in FIG. 1.
Figure 4:
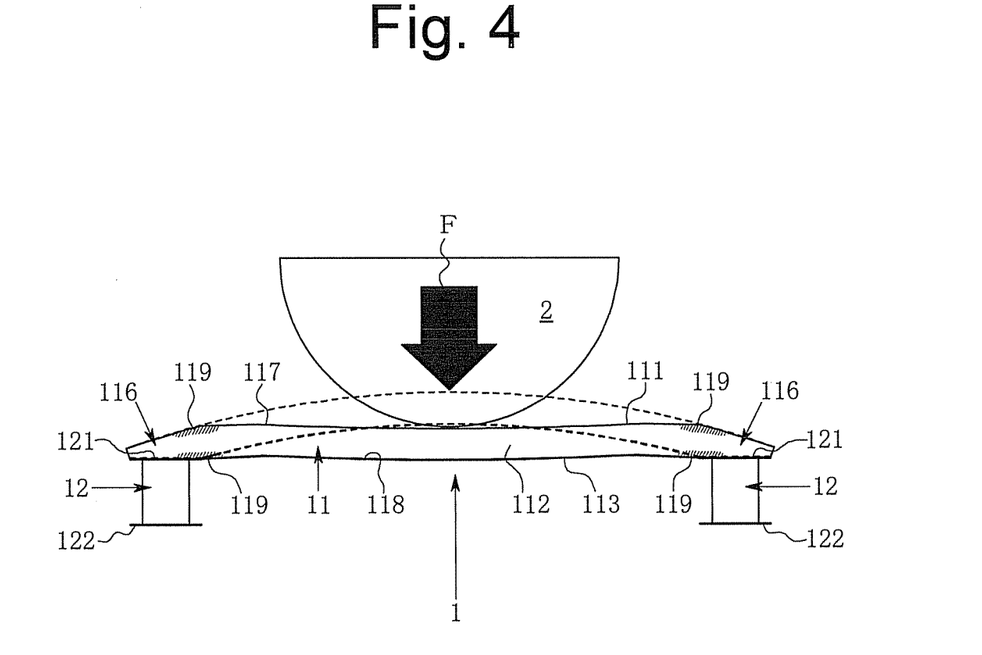
FIG. 4 is a plain view of the bumper illustrated in FIG. 1, the bumper is undergoing a light collision.
Figure 5:
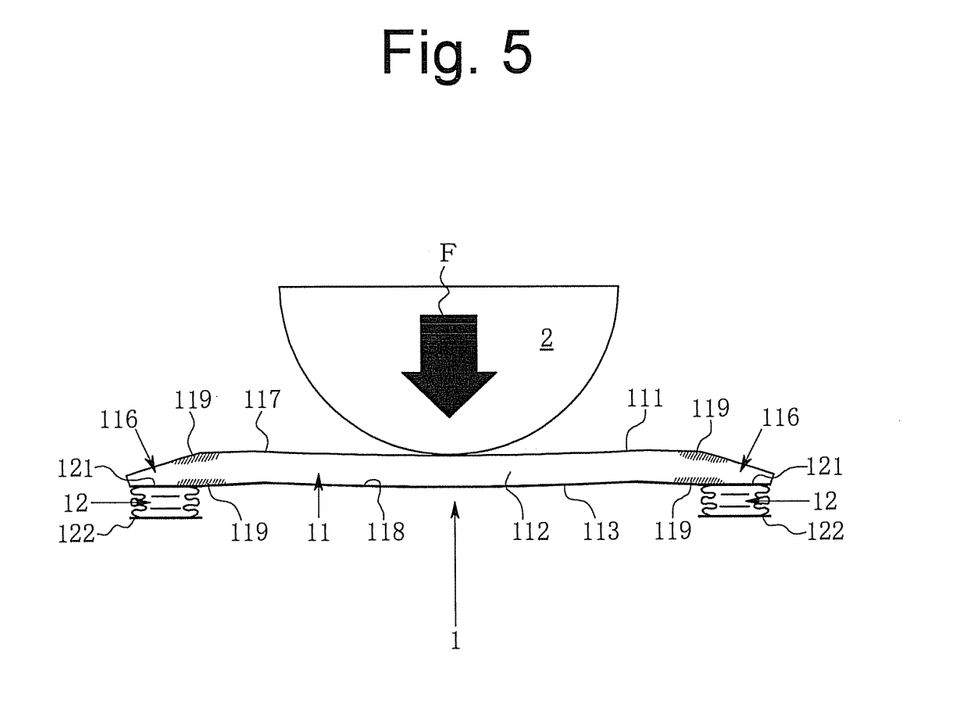
FIG. 5 is a plain view of the bumper illustrated in FIG. 1, the bumper is undergoing a heavy collision.

While undergoing the heavy collision, above said protruded portion at the middle portion of the reinforcement beam 11 possibly damages a radiator provided behind the reinforcement beam 11. According to the bumper of the present invention, the reinforcement beam 11 plastically deforms at the pair of connecting portions or a pair of adjacent portions inside the pair of connecting portions to flat the reinforcement beam 11 as illustrated in FIG. 5. Therefore, the reinforcement beam 11 of the present invention does not protrude at the middle portion and does not damage the radiator while undergoing both of the light collision and the heavy collision.

Force stroke curves of each bumper of the present example illustrated in FIGS. 1 to 5, the first comparative example in which whole of the reinforcement beam 11 is quenched and the second comparative example in which whole of the reinforcement beam is not quenched at all are shown in FIG. 8. A load F required to cause the reinforcement beam 11 to displace backward at 100 mm becomes large in the bumper of the first comparative example while undergoing the light collision because the pair of support members 12, 12 crashes and inclines. However, a load F required to cause the reinforcement beam 11 to displace beyond 100 mm becomes small because the pair of support members 12, 12 already crashed and inclined while undergoing the light collision, which results in reduction in the energy adsorption amount with respect to the heavy collision.

In the bumper 1 of the second comparative example, a load F required to cause the reinforcement beam 11 to displace backward at 100 mm become smaller than that of the first comparative example because the pair of support members 12, 12 does not crash and incline and the reinforcement beam 11 absorbs the impact energy by bending the reinforcement beam at the middle thereof. The bumper 1 of the second comparative example requires displacement amount larger than 100 mm to absorb as large impact energy as the first comparative example does. On the other hand, a load F required to cause the reinforcement beam to displace beyond 100 mm become large since the pair of support members 12, 12 is intact and maintains original shape while undergoing the light collision, and it needs a large load to plastically deforming the pair of support members 12, 12, which results in an increase in the energy adsorption amount with respect to the heavy collision.

Force stroke curve of the bumper 1 of the present example is just as the one combining the curve of the first comparative example and the curve of the second comparative example. A load F required to cause the reinforcement beam to displace at 100 mm become large with respect to the light collision because the reinforcement beam 11 crashes at the unquenched portions 119 to flat the arch shaped reinforcement beam. The pair of the supporting member 12, 12 does not crash or incline while undergoing the light collision. This realizes that the bumper of the present example absorbs as large impact energy as the bumper of the first comparative example does with respect to the light collision. A load F required to cause the reinforcement beam 11 to displace beyond 100 mm becomes large with respect to the heavy collision because the pair of support members 12, 12 crashes in backward direction. This realizes that the bumper 1 of the present example absorbs as large impact energy as the bumper 1 of the second comparative example does with respect to the heavy collision. The bumper 1 of the present example makes it possible to absorb the large amount of the impact energy and prevent the reinforcement beam from protruding backward at the portion where the obstacle 2 collides and displacing in this protruding state.

What I claim is:

1. A bumper for vehicles comprising:
    a reinforcement beam made of metal; and
    a pair of support members having a hollow cross section, protruding from a vehicle frame, and supporting the reinforcement beam therebetween;
    wherein the reinforcement beam is provided with a pair of connecting portions to which the pair of support members is connected, the reinforcement beam is provided with a quenched region and unquenched portions, a mechanical strength of the unquenched portions is smaller than the mechanical strength of the pair of support members and the quenched region, the quenched region is provide over a portion including a middle of the reinforcement beam, the unquenched portions are provided on the pair of connecting portions or a pair of adjacent portions inside the pair of connecting portions, the unquenched portions are provided only over corners in a cross section of the reinforcement beam.

2. The bumper for vehicles according to claim 1, wherein the corners are cut across the pair of connecting portions or the pair of adjacent portions inside the pair of connecting portions.

3. The bumper for vehicles according to claim 2, wherein the cross section of the reinforcement beam is hat shaped or rectangular continuing in a longitudinal direction of the reinforcement beam, the unquenched portions are provided over only the corners of the hat shaped or the rectangular cross section cut across the pair of connecting portions or the pair of adjacent portions inside the pair of connecting portions, the unquenched portions are provided along the longitudinal direction to include the pair of connecting portions or the pair of adjacent portions inside the pair of connecting portions.

4. The bumper for vehicles according to claim 1, wherein the reinforcement beam has an arch shape in plain view.

* * * * *